United States Patent
Rivera et al.

(10) Patent No.: US 11,188,840 B1
(45) Date of Patent: Nov. 30, 2021

(54) MACHINE-LEARNING MODELS TO FACILITATE USER RETENTION FOR SOFTWARE APPLICATIONS

(71) Applicant: INTUIT INC., Mountain View, CA (US)

(72) Inventors: Christopher Rivera, San Diego, CA (US); Yao Morin, San Diego, CA (US); Jonathan Lunt, San Diego, CA (US); Massimo Mascaro, Walnut, CA (US)

(73) Assignee: INTUIT, INC., Mountain View, CA (US)

( * ) Notice: Subject to any disclaimer, the term of this patent is extended or adjusted under 35 U.S.C. 154(b) by 1007 days.

(21) Appl. No.: 15/859,209

(22) Filed: Dec. 29, 2017

(51) Int. Cl.
G06N 20/00 (2019.01)
G06N 7/00 (2006.01)
G06F 40/143 (2020.01)
H04L 29/08 (2006.01)
G06F 16/9535 (2019.01)

(52) U.S. Cl.
CPC ......... *G06N 7/005* (2013.01); *G06F 16/9535* (2019.01); *G06N 20/00* (2019.01); *H04L 67/025* (2013.01)

(58) Field of Classification Search
CPC ...... G06N 7/005; G06N 20/00; H04L 67/025; G06F 40/143; G06F 16/9535; G06F 3/048
USPC .................................. 715/200, 234; 706/12
See application file for complete search history.

(56) References Cited

U.S. PATENT DOCUMENTS

| | | | | |
|---|---|---|---|---|
| 8,606,725 | B1* | 12/2013 | Agichtein | G06Q 30/0251 706/12 |
| 8,756,172 | B1* | 6/2014 | Radovanovic | G06N 20/00 706/12 |
| 9,129,290 | B2* | 9/2015 | Kannan | G06N 7/005 |
| 9,405,427 | B2* | 8/2016 | Curtis | G06F 3/0481 |
| 10,657,556 | B1* | 5/2020 | Lu | G06N 20/00 |
| 2010/0161385 | A1* | 6/2010 | Karypis | G06Q 30/0254 705/7.31 |
| 2011/0246406 | A1* | 10/2011 | Lahav | G06N 5/046 706/46 |
| 2013/0311411 | A1* | 11/2013 | Senanayake | G06F 16/3349 706/13 |
| 2015/0269609 | A1* | 9/2015 | Mehanian | G06Q 30/0246 705/14.45 |

(Continued)

*Primary Examiner* — Manglesh M Patel
(74) *Attorney, Agent, or Firm* — Patterson + Sheridan LLP (57) ABSTRACT

An ordered combination of machine-learning models may be used to identify users who are likely to abandon use of an application, predict the reasons why those users are likely to abandon, and identify intervening actions that the application can perform to reduce the probability that the users will abandon the application. For example, a first machine-learning model determines a retention-prediction value indicating a probability that the user will complete a target action in the application before a session terminates. If the retention-prediction value satisfies a threshold condition, a second machine-learning model determines a reason why the session is likely to terminate before the user completes the target action. A third machine-learning model determines an intervention action for the application to perform to increase the probability that the user will complete the target action before the session terminates.

20 Claims, 4 Drawing Sheets

(56) References Cited

U.S. PATENT DOCUMENTS

| | | | |
|---|---|---|---|
| 2016/0019460 A1* | 1/2016 | Li | G06F 16/24578 |
| | | | 719/318 |
| 2017/0169438 A1* | 6/2017 | Maynard | G06Q 30/016 |
| 2019/0295105 A1* | 9/2019 | Sharma | G06Q 30/0201 |
| 2020/0151617 A1* | 5/2020 | Chauhan | H04L 67/22 |
| 2021/0110428 A1* | 4/2021 | Lu | G06Q 30/0243 |
| 2021/0158172 A1* | 5/2021 | Chen | G06K 9/6272 |
| 2021/0191506 A1* | 6/2021 | Wang | G06N 3/0454 |

* cited by examiner

MACHINE-LEARNING MODELS TO FACILITATE USER RETENTION FOR SOFTWARE APPLICATIONS

BACKGROUND

Field

Embodiments generally relate to systems for facilitating user retention for software applications, e.g., preventing users from abandoning an application. Specifically, embodiments disclosed herein describe a synergistic machine-learning system for predicting behavior of application users and selecting intervention actions for the application to perform to facilitate user retention.

Description of the Related Art

With machine-learning models, computing systems can improve and refine functionality without explicitly being programmed. Given a set of training data, a machine-learning model can generate and refine a function that determines a target attribute value based on one or more input features. For example, if a set of input features describes an automobile and the target value is the automobile's gas mileage, a machine-learning model can be trained to predict gas mileage based on the input features, such as the automobile's weight, tire size, number of cylinders, and engine displacement.

Some machine-learning models are well suited for domains that involve numerical features. Other machine-learning models, such as decision trees, lend themselves more readily to domains that involve categorical features.

The predictive accuracy a machine-learning model achieves ultimately depends on many factors. Ideally, training data for the machine-learning model should be representative of the population for which predictions are desired (e.g., unbiased and correctly labeled). In addition, training data should include a large number of training instances relative to the number of features on which predictions are based and relative to the range of possible values for each feature.

SUMMARY

One embodiment of the present disclosure includes a system comprising: one or more processors and memory storing one or more instructions that, when executed on the one or more processors, cause the system to: send one or more pages for display to a user via a network during an interaction session between the user and an application, wherein the one or more web pages include elements for collecting response data from the user; receive, via the pages, response data from the user, collect, via the application, additional data that characterizes user behavior during the interaction session; generate a composite data set from the response data and the additional data; determine, via a first machine-learning model based on the composite data set, a retention-prediction value indicating a probability that the user will complete a target action in the application before the interaction session terminates; determine that the retention-prediction value satisfies a threshold condition; determine, via a second machine-learning model based on the composite data set, a reason why the interaction session is likely to terminate before the user completes the target action; determine, via a third machine-learning model based on the composite data set, an intervention action for increasing the probability that the user will complete the target action before the interaction session terminates; and perform, via the application, the intervention action.

Another embodiment provides a computer-readable storage medium having instructions, which, when executed on a processor, perform an operation that generally includes: sending one or more pages for display to a user via a network during an interaction session between the user and an application, wherein the one or more web pages include elements for collecting response data from the user; receiving, via the pages, the response data from the user; collecting, via the application, additional data that characterizes user behavior during the interaction session; generating a composite data set from the response data and the additional data; determining, via a first machine-learning model based on the composite data set, a retention-prediction value indicating a probability that the user will complete a target action in the application before the interaction session terminates; determining that the retention-prediction value satisfies a threshold condition; determining, via a second machine-learning model based on the composite data set, a reason why the interaction session is likely to terminate before the user completes the target action; determining, via a third machine-learning model based on the composite data set, an intervention action for increasing the probability that the user will complete the target action before the interaction session terminates; and performing, via the application, the intervention action.

Another embodiment of the present disclosure includes a method that generally includes: sending one or more pages for display to a user via a network during an interaction session between the user and an application, wherein the one or more web pages include elements for collecting response data from the user; receiving, via the pages, the response data from the user; collecting, via the application, additional data that characterizes user behavior during the interaction session; generating a composite data set from the response data and the additional data; determining, via a first machine-learning model based on the composite data set, a retention-prediction value indicating a probability that the user will complete a target action in the application before the interaction session terminates; determining that the retention-prediction value satisfies a threshold condition; determining, via a second machine-learning model based on the composite data set, a reason why the interaction session is likely to terminate before the user completes the target action; determining, via a third machine-learning model based on the composite data set, an intervention action for increasing the probability that the user will complete the target action before the interaction session terminates; and performing, via the application, the intervention action.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of the scope of the disclosure. The scope of the disclosure may admit to other embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein provide systems for reducing user application abandonment. Specifically, embodiments disclosed herein describe a machine-learning system for predicting behavior of application users and selecting intervention actions for the application to perform to facilitate user retention.

Typically, software vendors and other entities that provide web applications hope to achieve a desired outcome when users access those applications. A desired outcome for a software vendor, for example, may be that a user purchases some product or service offered through the application. In another example, a desired outcome for a research organization may be that a user completes and submits a set of survey responses through the application.

However, the desired outcome may not occur every time a user accesses the application. If the user is confused by some aspect of the application, the user may decide to quit using the application prematurely. For example, many users abandon using tax-preparation software before filing their tax returns because many users are confused by the terminology used on tax forms presented within the tax-preparation software.

Systems described herein use an ordered combination machine-learning models to identify users who are likely to abandon use of an application, predict the reasons why those users are likely to abandon, and identify intervening actions that the application can perform to reduce the probability that the users will abandon the application. Furthermore, systems described herein may also predict the next action the user will perform within the application, pre-fetch data (e.g., pages, instructions, etc.) related to the next action, and refrain from fetching data unrelated to the next action prematurely. This can accelerate application response time, promote efficient use of memory and network bandwidth, and enhance the Quality of Experience (QoE) for the user overall.

Figure 1:
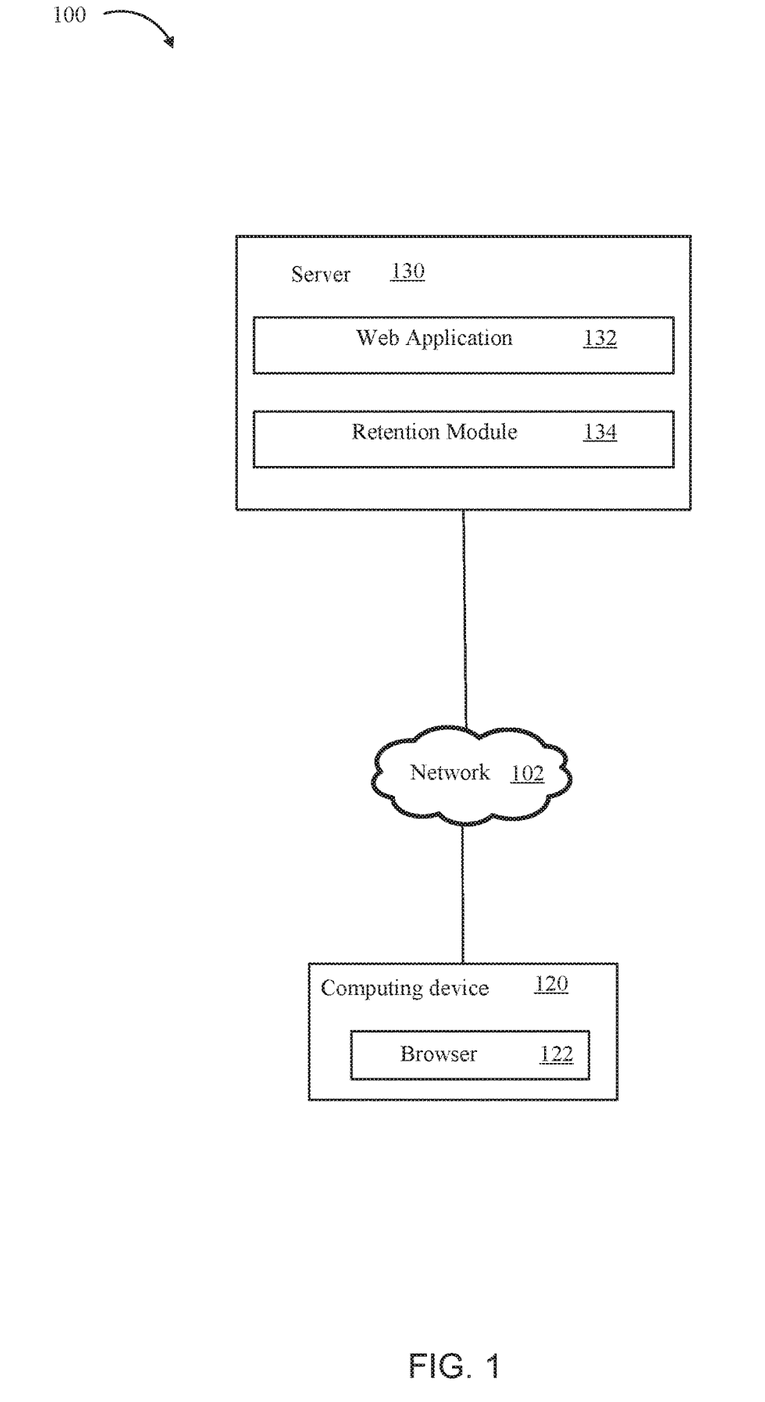
FIG. 1 illustrates a computing network environment in which technology of the present disclosure can operate, according to one embodiment.

FIG. 1 illustrates a computing network environment 100 in which technology of the present disclosure can operate, according to one embodiment. As shown, the computing network environment 100 includes a network 102, a computing device 120, and a server 130. A web application 132 is provided by the server 130. A browser 122 executes at the computing device 120 and communicates with the web application 132 via the network 102. Functionality attributed to the web application 132 may be applied using code executed by the server 130, code executed by the computing device 120 via the browser 122, or a combination of both server-side code and client-side code. Note that, in some embodiments, a standalone dedicated application that executes on the computing device 120 may be used instead of the browser 122. Also, though the server 130 is illustrated as a single computing device for clarity, the components and functions attributed to the server 130 may be spread across multiple servers and computing resources (e.g., in a cloud-computing environment).

The web application 132 may be configured to display a number of web pages in succession to a user via the browser 122 in order to collect response data from the user. For example, the web application 132 may be an Ajax-style application that uses objects defined in a data-interchange format such as Javascript Object Notation (JSON) to define the pages. The objects may include logic and member functions, member data such as primitive attributes, objects, and other constructs that define what will be displayed and what information will be solicited from the user on each page displayed.

After a user provides input through a first page of the web application 132, successive pages may dynamically generate content displayed to the user based on the input from the first page. The sequence of pages shown to a user may vary depending on the information the user provides. For example, if the web application 132 is tax-preparation application, a user who enters income recorded on a 1099-MISC form may be shown a page asking the user to enter business expenses. However, the web application 132 does not show this page for business expenses to a user who only enters income recorded on a W-2 form. By adjusting the sequence of pages shown to the user in this fashion, the web application 132 ensures that the content displayed on the pages and the information gathered is relevant to the user's tax return. Similarly, if the web application 132 is software for determining a patient's medical history, a user who indicates she has received an organ donation may be shown a follow-up page asking for more details about the organ donation (e.g., the type of organ transplanted, the date the transplant operation was performed, the types of immuno-suppressant drugs prescribed, etc.). By contrast, a user who indicates she has never received an organ transplant would not be shown the follow-up page.

Once a sufficient collection of response data has been collected from the user, the web application 132 can invite the user to complete a target action. The nature of the target action may vary depending on the purpose of the web application 132. For example, if the web application 132 is software for preparing tax returns, the target action may be that the user purchases one or more tax-preparation services or products offered through the web application 132. However, in other examples, the target action may be something other than a purchase. For example, if the web application 132 is designed to conduct a survey, the target action may be for a user to click a button to submit survey responses. Hence, the subject matter described herein is not limited to implementations that involve commerce. Embodiments in which the web application 132 is described as tax-preparation software are provided solely as an example for illustrative purposes to facilitate understanding of the broader concepts disclosed herein.

In some cases, a user may discontinue using the web application 132 (e.g., via the web browser 122) without completing the target action. For example, if the web application 132 is tax-preparation software, the user may abandon using the web application 132 because the user is confused by questions displayed on a page of the web application; or the user may become dissatisfied with how long it is taking to finish entering the requested information; or the user may be unwilling to pay a posted price for a product or service offered, which is necessary to complete the user's tax return. Regardless of the reason, if the user abandons using the web application 132, a potential or existing customer may be lost. Similarly, if the web application 132 is software for conducting surveys, the user may be confused or unwilling to respond to a question asked. In this example, potentially valuable response data is lost if the user abandons using the web application 132.

To reduce or prevent user abandonment of the web application 132, the server 130 includes a retention module 134. Throughout an interaction session between the user and the application 132, the retention module 134 determines a retention-prediction value at regular or varying time intervals. The retention-prediction value may be the probability that the user will abandon using the application 132 before completing the target action. Alternatively, the retention-prediction value may be the probability that the user will complete the target action (i.e., one minus the probability that the user will abandon). In other embodiments, the retention-prediction value may be a numeric or categorical value that maps to either the probability of abandonment or the probability of completion in a predefined scheme. Regardless, the retention-prediction value indicates the probability of abandonment or the probability of completion in one way or another. In some embodiments, the retention module 134 determines the retention-prediction value via a first machine-learning model (e.g., as described in greater detail in FIG. 2) that calculates the retention-prediction value based on input features. The input features may be based on (i.e., represented by, contained in, or derived from) a composite information set.

The composite information set may include both the explicit response data provided by the user and additional data that characterizes the user's current interaction session with the web application 132. For example, in the context of an example tax preparation web application, the explicit response data may include values such as: a name, a birthdate, an address, a number of dependents, an income amount, one or more tax deductions, one or more tax credits, a filing status, one or more moving expenses, a federal tax withholding, or the like. The additional data may include, for example, the amount of time the user has spent on a page currently being displayed; the amounts of time the user spent on previously displayed pages, respectively; the cumulative amount of time spent during the current interaction session; the numbers of different types of events (e.g., click events, mouse-over events, etc.) initiated by the user on each page; the cumulative numbers of different types of events initiated by the user during the interaction session; how many times a "back" button in the browser 122 has been clicked during the interaction session; how many times the user has returned to previously displayed pages; whether the user has changed or erased entries in input fields; how many times the user has clicked a "next" button to proceed to subsequent pages before entering data in required input fields on a current page; how many times a user has clicked on a "help" icon; and other types of data related to the user's interaction with the web application 132. Furthermore, if the computing device 120 is a mobile device, the additional data may also include the user's location (e.g., as indicated by a global positioning system (GPS) associated with the computing device 120), a rate of movement of the device based on GPS measurements (which may indicate that the user is in a hurry or attempting to multitask), and linguistic or paralinguistic features of audio input received through a microphone associated with the computing device 120 (which may indicate whether the user is frustrated).

The retention module 134 updates the retention-prediction value throughout the interaction session as updated composite information (e.g., both response data and additional data) becomes available. For example, the retention module 134 may recalculate the retention-prediction value when the user provides input through an element on a page (e.g., an input field or a button). In one embodiment, the retention module 134 recalculates the retention-prediction value each time a selected time interval passes. Also, each time the retention module 134 recalculates the retention-prediction value, the retention module 134 may also estimate a rate of change of the retention-prediction value. For example, the retention module 134 may subtract a preceding retention-prediction value from the recalculated retention-prediction value and divide the difference by the length of the time interval between the preceding value and the recalculated value to estimate a rate at which the retention-prediction value is changing. If the rate of change suggests that the probability of the user completing the target action is decreasing at more than a threshold rate, the retention module 134 may reduce the length of the time interval in proportion to the rate of change. As a result, the retention module 134 may recalculate the retention-prediction value more frequently if the probability of the user completing the target task is decreasing faster than the threshold rate.

When the retention-prediction value is calculated or updated, the retention module 134 also compares the updated retention-prediction value to a threshold retention-prediction value. If the updated retention-prediction value meets the threshold retention-prediction value (e.g., is less than or equal to the threshold retention-prediction value, is greater than or equal to the threshold retention-prediction value, etc.), the retention module 134 selects an intervention action for the web application 132 to perform. The purpose of the intervention action is to dissuade the user from abandoning use of the web application 132, thereby increasing the probability that the user will perform the target action.

To select the intervention action, the retention module 134 first determines, via a second machine-learning model (as described in greater detail in FIG. 2), a reason that the user is likely to fail to complete the target action. The second machine-learning model determines the reason based on the retention-prediction value and input features that are based on the composite information set. The reason may be selected from a predefined set of possible reasons (e.g., "confusion," "cost too high," "taking too much time," "dissatisfied," "language barrier," etc.).

Once the reason has been determined, the retention module 134 determines the intervention action via a third machine-learning model (as described in greater detail in FIG. 2) based on the retention-prediction value, the reason, and input features based on (e.g., derived from) the composite information set. The intervention action may be selected from a predefined set of possible intervention actions (e.g., "offer discount," "connect with live assistance," "change display language," "open dialog box with additional explanation," "show instructional demonstration video," etc.).

Once the retention module 134 has determined the intervention action, the retention module 134 signals the web application 132 to perform the intervention action. For example, if the intervention action is to connect the user with a live support agent, the web application 132 can open a messaging interface (e.g., a chat window or a two-way audio connection) via the browser 122. The messaging interface can allow the user to communicate with a live support agent via the network 102. In another example, if the intervention action is to offer the user a discount for a product or service, the web application 132 can present the discount offer in the browser 122 (e.g., in a sidebar, a pop-up window, or another page element).

At regular intervals during the interaction session, the retention module 134 may also predict the next action a user will take and customize the page(s) and/or content presented to the user based on the prediction. The retention module 134 may predict the next action via a fourth machine-learning model (as described in greater detail in FIG. 2) based on the retention-prediction value, the reason (if the retention-prediction value meets the threshold retention-prediction value), and input features based on the composite information set. For example, suppose the web application 132 is tax-preparation software and the user enters a value in a text input field labeled "routing number" (e.g., to indicate that the user would like to receive a tax refund via direct deposit). The retention module 134 may predict the user's next action will be to enter an account number in an adjacent text input field labeled "account number." Based on this prediction, the web application 132 may customize the page to make the predicted action easier for the user to perform. For example, the web application 132 may dynamically increase the display size of the "account number" label and the adjacent text input field, highlight the adjacent text field, or display a pop-up balloon with instructions next to the adjacent text field. By customizing the pages and content presented during the interaction session in this manner, the web application 132 may provide a more satisfactory quality of experience (QoE) for the user.

Figure 2:
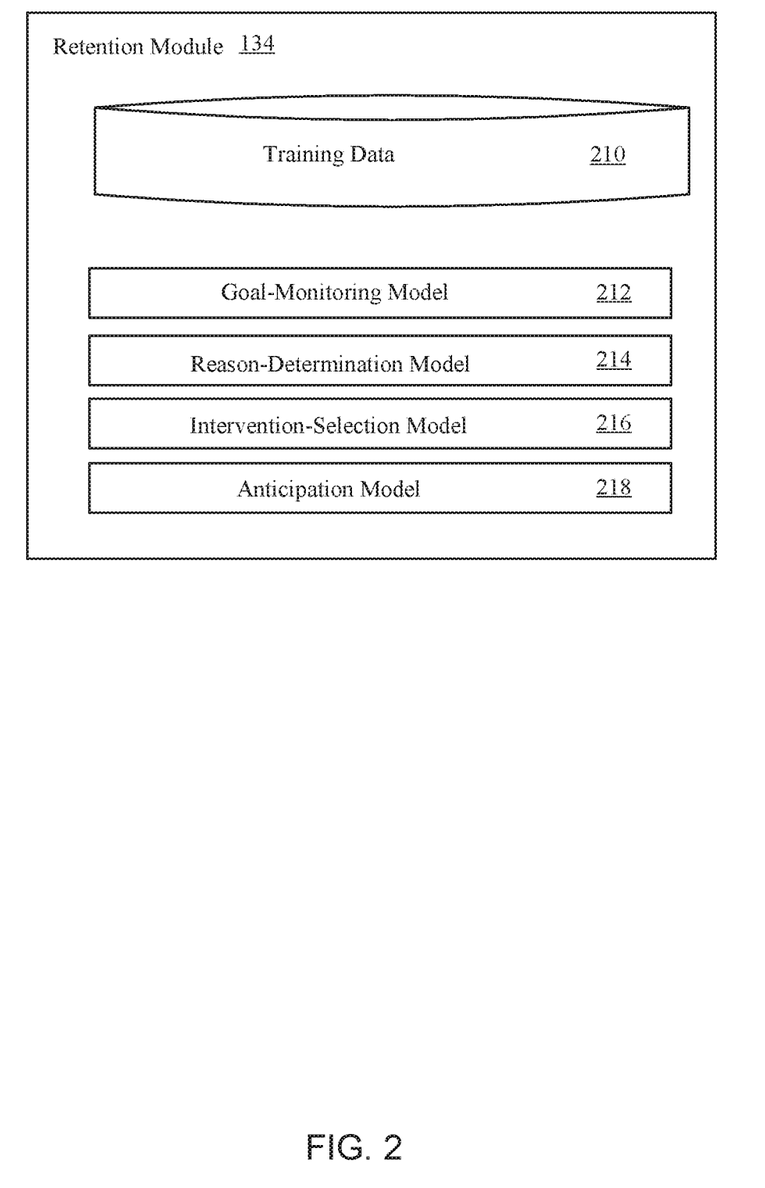
FIG. 2 illustrates a detailed view of a retention module, according to one embodiment.

FIG. 2 illustrates a detailed view of the retention module 134, according to one embodiment. As shown, the retention module 134 includes training data 210, goal-monitoring model 212, reason-determination model 214, intervention-selection model 216, and anticipation model 218. Although the training data 210 is shown to be a component of the retention module 134 for simplicity, it should be understood that the training data 210 may be stored in a location that is remote from the location where software of the retention module 134 executes.

The training data 210 may comprise composite information, for example in the form of composite data sets, describing previous interaction sessions between users and the web application 132. In addition, the training data 210 may also comprise attributes and labels that describe any intervention actions taken during those previous interaction sessions, whether the users completed the target actions for the previous interactions sessions, and the underlying reasons (e.g., as predicted by the third machine learning model 216 or as verified by surveying the users) why any of those users did not complete the target actions during the previous interaction sessions.

The goal-monitoring model 212 is a machine-learning model. Using the training data 210, the goal-monitoring model 212 is trained to predict retention-prediction values for interaction sessions using input features that are based on the composite data sets that describe those interaction sessions. In one example, the composite data sets comprise actual input features. In another embodiment, input features are generated by applying one or more preprocessing steps (e.g., normalizing, discretizing, quantifying, etc.) to information in the composite data sets. For example, categorical or ordinal data may be converted to numeric data through known methods.

The retention-prediction value predicted for a particular interaction session based on the associated input features indicates the probability of user abandonment without completion of the target action. For example, the retention-prediction may be a literal probability of abandonment (e.g., a real number ranging from zero to one), a probability of completion of the target action (e.g., a real number equal to one minus the probability of abandonment), or some other type of value (e.g., a categorical value or a discrete value) that can be mapped to a probability of abandonment according to a predefined function available to the retention module 134.

A training instance may comprise a set (e.g., a vector) of input features and an associated target retention-prediction value. The target retention-prediction value may be a label that has been empirically verified for the training instance. For example, if a user ultimately abandoned an interaction session described by a particular set of input features, a training instance including those input features can be labeled with a zero (the target retention-prediction value) to indicate the target action was not completed or a one (or some other non-zero value) to indicate the target action was completed. The composite data set for a single interaction session may be used to generate multiple training instances. For example, an interaction session takes place over a definite period of time. The period of time may be defined by a first timestamp when the interaction session commenced and a second timestamp when the interaction session terminated. A first training instance may include input features that describe the interaction session for a first time window ranging from the first timestamp to a first point in time that lies between the first timestamp and the second timestamp. A second training instance may include input features that describe the interaction session for a second time window ranging from the first timestamp to a second point in time that lies between the first point in time and the second timestamp. Subsequent training instances based on the interaction session may be defined according to the same pattern, where each subsequent training instance includes input features that describe the interaction session for a time window ranging from the first timestamp to a point in time that lies between the end of a preceding time window (of a preceding training instance) and the second timestamp. When arranged in chronological order, training instances based on the same interaction session make up a time series for training the goal-monitoring model 212. Time-series training instances corresponding to many different interaction sessions may be used to train the goal-monitoring model 212.

In general, for most types of machine-learning models to achieve robust prediction accuracy, the number of input features in any particular training instance should be small relative to the total number of training instances used to train the machine-learning model. In some embodiments, the number of features for each training instance can be at least three orders of magnitude smaller than the total number of training instances used to train the machine-learning model.

There are many different types of inductive and transductive machine-learning models that can be used for the goal-monitoring model 212, including: adsorption models, neural networks, support vector machines, Bayesian belief networks, association-rule models, decision trees, nearest-neighbor models (e.g., k-NN), regression models, artificial neural networks, deep belief networks, and Q-learning models, among others.

Many configurations and parameter combinations may be possible for a given type of machine-learning model. For example, with a neural network, the number of hidden layers, the number of hidden nodes in each layer, and the existence of recurrence relationships between layers can vary. Batch gradient descent or stochastic gradient descent may be used in the process of tuning weights for the nodes in the neural network. The learning rate parameter, which partially determines how much each weight may be adjusted at each step, may be varied. Input features may be normalized. Other parameters that are known in the art, such as momentum, may also be applied to improve neural network performance.

In another example, decision trees can be constructed using a variety of approaches, including: the iterative dichotomiser 3 (ID3), Classification and Regression Tree (CART), and CHi-squared Automatic Interaction Detection (CHAID) methods. These methods may use one or more different metrics to determine the order in which attribute values are examined in decision trees, including: information gain and Gini impurity. In addition, pruning methods may be applied to improve decision tree performance, including: reduced error pruning, and cost complexity pruning.

Furthermore, individual machine learning models can be combined to form an ensemble machine-learning model. An ensemble machine-learning model may be homogenous (i.e., using multiple member models of the same type) or non-homogenous (i.e., using multiple member models of different types). Individual machine-learning models within an ensemble may all be trained using the same training data or may be trained using overlapping or non-overlapping subsets randomly selected from a larger set of training data. The Random-Forest model, for example, is an ensemble model in which multiple decision trees are generated using randomized subsets of input features and randomized subsets of training instances.

Since the training data 210 can be used to generate time-series training instances from the composite data sets that describe previous interaction sessions, the goal-monitoring model 212 may be a deep recurrent long short-term memory (LSTM) model. When instances in a time series are fed into an LSTM model in chronological order, the LSTM can recall information (e.g., input features and predicted retention-prediction values) found in previous instances that have been input into the LSTM. When predicting a current retention-prediction value for a current instance, the LSTM can use both the input features of the current instance and the recalled information from previous instances to predict the current retention-prediction value more accurately. Though a full explanation of LSTM models is beyond the scope of this disclosure, LSTM models can be generated using publicly available software libraries, such as TENSORFLOW™.

The reason-determination model 214 is also a machine-learning model. The reason-determination model 214 is trained to predict a reason that a user is likely to fail to complete a target action for an interaction session. Like the goal-monitoring model 212, the reason-determination model 214 is trained using input features that are based on the composite data sets that describe interaction sessions. In one example, the composite data sets comprise actual input features used for the reason-determination model 214. In another embodiment, input features are generated by applying one or more preprocessing steps (e.g., normalizing, discretizing, etc.) to information in the composite data sets. The input features for the reason-determination model 214 may also include the retention-prediction value predicted by the goal-monitoring model 212 for a given interaction session (or time window thereof).

A set (e.g., a vector) of input features and an associated target reason (i.e., a known reason indicating why a user abandoned) make up a training instance for the reason-determination model 214. As explained above with respect to the goal-monitoring model 212, the composite data set for a single interaction session may be used to generate multiple training instances for the reason-determination model 214. For example, the composite data set for a single interaction session may be used to generate multiple training instances that make up a time series. Like the goal-monitoring model 212, the reason-determination model 214 may be an LSTM model or another type of machine-learning model.

The intervention-selection model 216 is also a machine-learning model. The intervention-selection model 216 is trained to predict an intervention action that will increase the probability that a user will complete a target action during an interaction session. Like the goal-monitoring model 212, the intervention-selection model 216 is trained using input features that are based on the composite data sets of the training data 210 that describe interaction sessions. In one example, the composite data sets include actual input features used for the intervention-selection model 216. In another example, input features are generated by applying one or more preprocessing steps (e.g., normalizing, discretizing, etc.) to information in the composite data sets. The input features for the intervention-selection model 216 may also include the retention-prediction value predicted by the goal-monitoring model 212 and the reason predicted by the reason-determination model 214 for a given interaction session (or time window thereof).

A set of input features and an associated target intervention action (i.e., an intervention action used during an interaction session in which a user completed a target action) make up a training instance for the intervention-selection model 216. As explained above with respect to the goal-monitoring model 212, the composite data set for a single interaction session may be used to generate multiple training instances for the intervention-selection model 216. The composite data set for a single interaction session may be used to generate multiple training instances that make up a time series. Like the goal-monitoring model 212, the intervention-selection model 216 may be an LSTM model or another type of machine-learning model.

The anticipation model 218 is trained to predict the next action that a user will take during an interaction session. Like the goal-monitoring model 212, the anticipation model 218 is trained using input features that are based on the composite data sets that describe interaction sessions (e.g., found in training data 210). In one example, the composite data sets contain actual input features used for the anticipation model 218. In another example, input features are generated by applying one or more preprocessing steps (e.g., normalizing, discretizing, etc.) to information in the composite data sets. The input features for the anticipation model 218 may also include the retention-prediction value predicted by the goal-monitoring model 212, the reason predicted by the reason-determination model 214, or the intervention action selected by the intervention-selection model 216 for a given interaction session (or time window thereof).

A set of input features and an associated next action (i.e., the next action that the user actually performed in a next time window, as described in the training data 210) make up a training instance for the anticipation model 218. As explained above with respect to the goal-monitoring model 212, the composite data set for a single interaction session may be used to generate multiple training instances for the anticipation model 218. The composite data set for a single interaction session may be used to generate multiple training instances that make up a time series. Like the goal-monitoring model 212, the anticipation model 218 may be an LSTM model or another type of machine-learning model.

Figure 3:
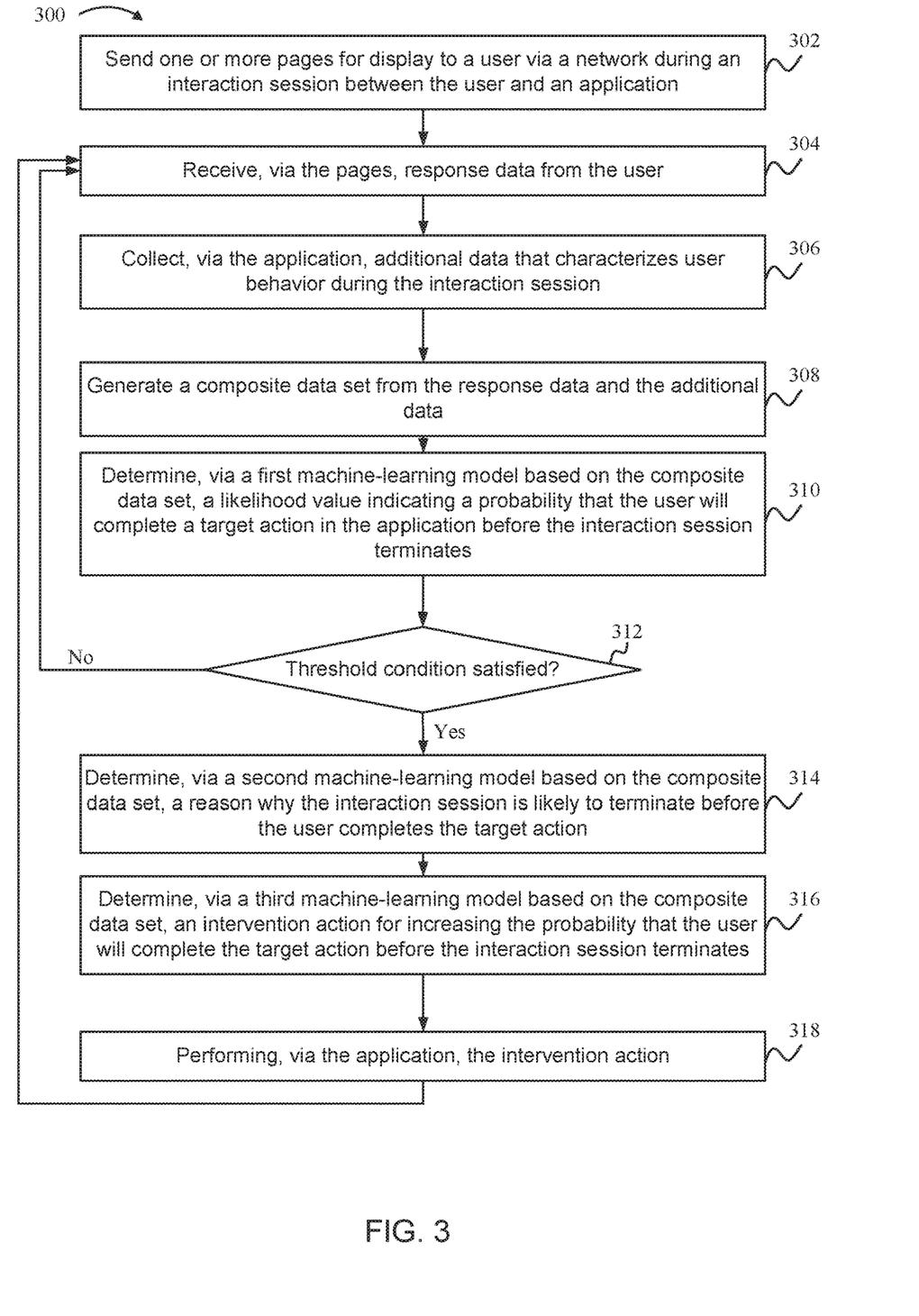
FIG. 3 illustrates a process for reducing user abandonment of an application, according to one embodiment.

FIG. 3 is a flow diagram illustrating a process 300 for reducing user abandonment of an application, according to one embodiment.

As shown in block 302, the process 300 includes sending one or more pages for display to a user via a network during an interaction session between the user and an application. The application may be a web application executing on a server and the pages may be displayed to the user on a client device in a browser or in a dedicated application. The one or more pages include elements for collecting response data from the user, such as input fields for text, buttons, check boxes, radio buttons, and the like.

As shown in block 304, the process 300 includes receiving, via the pages, the response data from the user. The response data may include information explicitly provided by the user (e.g., name, birthdate, address, preferences, etc.).

As shown in block 306, the process 300 includes collecting, via the application, additional data that characterizes user behavior during the interaction session. The additional data may include, for example, the amount of time the user has spent on a page currently being displayed; the amounts of time the user spent on previously displayed pages, respectively; the cumulative amount of time spent during the current interaction session; the numbers of different types of events (e.g., click events, mouse-over events, etc.) initiated by the user on each page; the cumulative numbers of different types of events initiated by the user during the interaction session; how many times a "back" button in the browser has been clicked during the interaction session; how many times the user has returned to previously displayed pages; whether the user has changed or erased entries in input fields; how many times the user has clicked a "next" button to proceed to subsequent pages before entering data in required input fields on a current page; how many times a user has clicked on a "help" icon; and other types of data. Furthermore, if the computing device is a mobile device, the additional data may also include the user's location (e.g., as indicated by a global positioning system (GPS) associated with the computing device), a rate of movement of the device based on GPS measurements (which may indicate that the user is in a hurry or attempting to multitask), and linguistic or paralinguistic features of audio input received through a microphone associated with the computing device (which may indicate whether the user is frustrated).

As shown in block 308, the process 300 includes generating a composite data set from the response data and the additional data.

As shown in block 310, the process 300 includes determining, via a first machine-learning model based on the composite data set, a retention-prediction value indicating a probability that the user will complete a target action in the application before the interaction session terminates. If a previous retention-prediction value for the interaction session has been calculated, the retention-prediction value determined in block 310 may be an updated retention-prediction values based on an updated composite data set. In such a case, the operations 300 may also include subtracting the previous retention-prediction value from the updated retention-prediction value to determine a difference; dividing the difference by a time interval to determine a rate of change; and determining an updated time interval based on the rate of change. Once the updated time interval elapses, another updated retention-prediction can be determined.

As shown in block 312, the process 300 includes determining whether the retention-prediction value satisfies a threshold condition. The threshold condition may be, for example, that the retention-prediction value is less than or equal to a threshold retention-prediction value. If the threshold condition is satisfied, the flow of process 300 proceeds to block 314. Otherwise, the flow of process proceeds back to block 304.

As shown in block 314, the process 300 includes determining, via a second machine-learning model based on the composite data set, a reason why the interaction session is likely to terminate before the user completes the target action. The reason may be selected from a predefined set of possible reasons (e.g., a set comprising reasons such as "confusion," "cost too high," "taking too much time," "dissatisfied," "language barrier," etc.). Determining the reason via the second machine-learning model based on the composite data set may include inputting a set of input features that includes the retention-prediction value into the second machine-learning model.

As shown in block 316, the process 300 includes determining, via a third machine-learning model based on the composite data set, an intervention action for increasing the probability that the user will complete the target action before the interaction session terminates. The intervention action may be selected from a predefined set of possible interventions (e.g., a set comprising intervention actions such as "offer discount," "connect with live assistance," "change display language," "open dialog box with additional explanation," "show instructional demonstration video," etc.). Determining the intervention action via the third machine-learning model may include inputting a set of input features that includes the retention-prediction value or the reason into the third machine-learning model.

As shown in block 318, the process 300 includes performing, via the application, the intervention action. Performing the intervention action may include opening, via the application, a messaging interface and establishing a network connection with a live support agent to allow the live support agent communicate with the user through the messaging interface.

Optionally, the process 300 may also include determining, via a fourth machine-learning model based on the composite data set, a next action the user is anticipated to perform in the application and altering at least one aspect of the one or more web pages to facilitate user performance of the next action. For example, if the next action is that the user will enter text in a field, the application may dynamically increase the display size of a label of the field and/or the field itself, highlight the field, or display a pop-up balloon with instructions near the field to explain a format in which text should be entered into the field. If the next action is that the user will click a button labeled "save changes," the application can identify any elements on the page marked as "response required" for which the user has not yet provided a response, highlight the elements, and display a message explaining that the user must provide the responses before moving on to the next page. Also, the application can determine which page to display next based on the user's inputs.

Predicting the next action the user will perform allows the application to pre-fetch data (e.g., pages, instructions, etc.) related to the next action and to avoid fetching data unrelated to the next action prematurely. This can accelerate application response time, promote efficient use of memory and network bandwidth, and enhance the QoE for the user overall.

Figure 4:
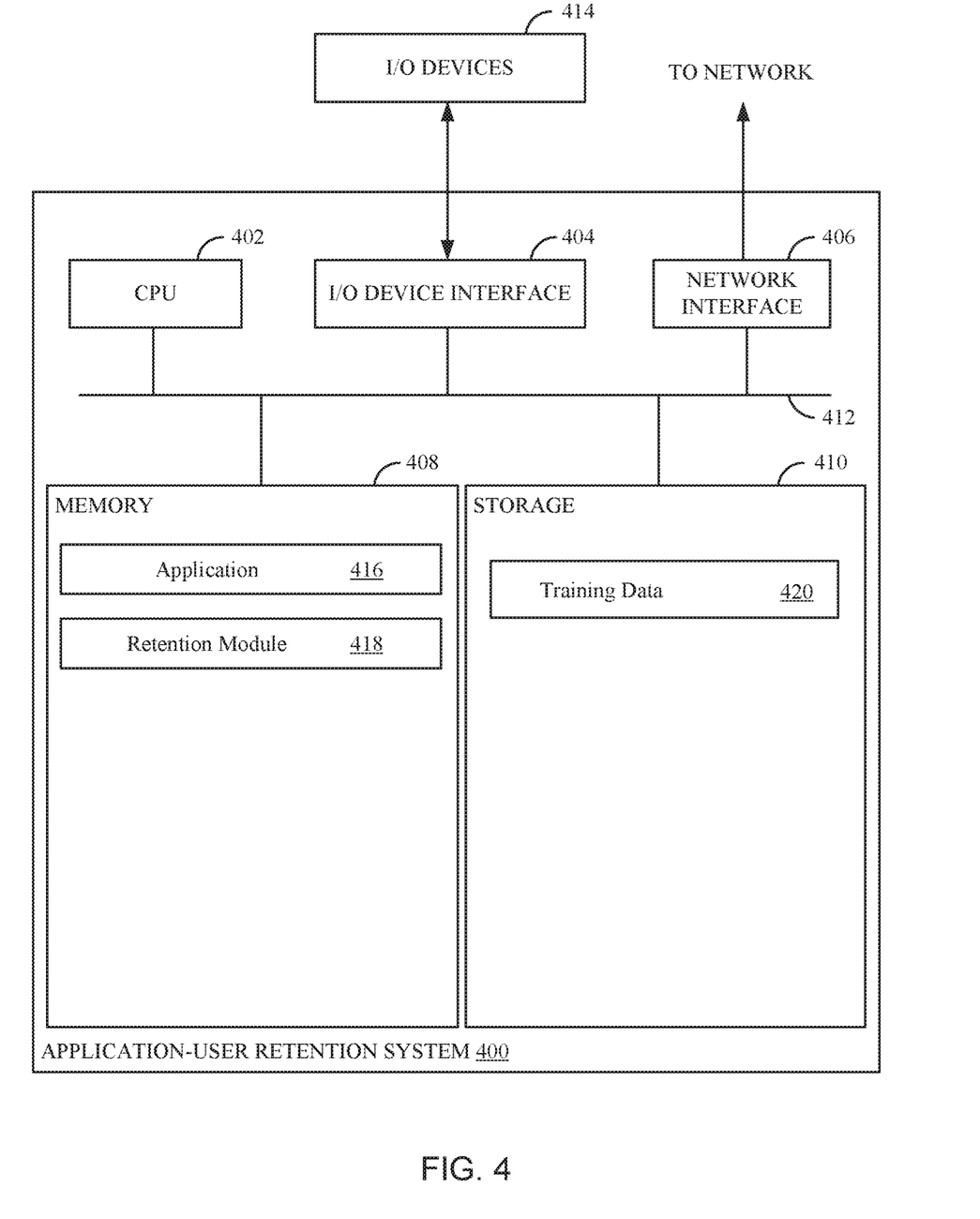
FIG. 4 illustrates an application-user retention system 400, according to an embodiment.

FIG. 4 illustrates an application-user retention system 400, according to an embodiment. As shown, the application-user retention system 400 includes a central processing unit (CPU) 402, at least one I/O device interface 404 which may allow for the connection of various I/O devices 414 (e.g., keyboards, displays, mouse devices, pen input, speakers, microphones, motion sensors, etc.) to the application-user retention system 400, network interface 406, a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 406, memory 408, and storage 410. CPU 402 can represent a single CPU, multiple CPUs, a single CPU having multiple processing cores, and the like. Additionally, the memory 408 represents random access memory. Furthermore, the storage 410 may be a disk drive. Although shown as a single unit, the storage 410 may be a combination of fixed or removable storage devices, such as fixed disc drives, removable memory cards or optical storage, network attached storage (NAS), or a storage area-network (SAN).

As shown, memory 408 includes an application 416 and a retention module 418. Storage 410 includes training data 420.

The application-user retention system 400 can operate in the following manner. The application 416 sends one or more pages for display to a user (e.g., via I/O device interface 404 or network interface 406) as part of an interaction session between the user and the application 416. The one or more web pages include elements for collecting response data from the user. The application 416 receives the response data from the user (e.g., via I/O device interface 404 or network interface 406) in response to the sending. The application 416 also collects additional data that characterizes user behavior during the interaction session. The application 416 generates a composite data set from the response data and the additional data.

Next, the retention module 418 determines, via a first machine-learning model based on the composite data set, a retention-prediction value indicating a probability that the user will complete a target action associated with the application 416 before the interaction session terminates. If that the retention-prediction value satisfies a threshold condition, the retention module 418 determines, via a second machine-learning model based on the composite data set, a reason why the interaction session is likely to terminate before the user completes the target action. Furthermore, the retention module 418 determines, via a third machine-learning model based on the composite data set, an intervention action for increasing the probability that the user will complete the target action before the interaction session terminates. The application 416 performs the intervention action.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
one or more processors and memory storing one or more instructions that, when executed on the one or more processors, cause the system to:
send one or more web pages for display to a user via a network during an interaction session between the user and an application, wherein the one or more web pages include elements for collecting response data from the user;
receive, via the web pages, response data from the user,
collect, via the application, additional data that characterizes user behavior during the interaction session;
generate a composite data set from the response data and the additional data;
determine, via a first machine-learning model based on the composite data set, a retention-prediction value indicating a probability that the user will complete a target action in the application before the interaction session terminates;

determine that the retention-prediction value satisfies a threshold condition;

determine, via a second machine-learning model based on the composite data set and the retention-prediction value determined by the first machine-learning model, a predicted reason the interaction session is likely to terminate before the user completes the target action;

determine, via a third machine-learning model based on the composite data set and the predicted reason determined by the second machine-learning model, an intervention action for increasing the probability that the user will complete the target action before the interaction session terminates; and perform, via the application, the intervention action.

2. The system of claim 1, wherein the instructions, when executed on the one or more processors, further cause the system to:

determine, via a fourth machine-learning model based on the composite data set, a next action the user is anticipated to perform in the application; and alter at least one aspect of the one or more web pages to facilitate user performance of the next action.

3. The system of claim 2, wherein the instructions, when executed on the one or more processors, further cause the system to:

fetch, via the application, data related to the next action determined via the fourth machine-learning model.

4. The system of claim 1, wherein determining the intervention action via the third machine-learning model includes: inputting a set of input features that includes the retention-prediction value into the third machine-learning model.

5. The system of claim 1, wherein the instructions, when executed on the one or more processors, further cause the system to:

receive, via the web pages, updated response data from the user;

collect, via the application, updated additional data that characterizes user behavior during the interaction session;

generate an updated composite data set that includes both the updated response data and the updated additional data; and determine, via the first machine-learning model based on the updated composite data set, an updated retention-prediction value indicating an updated probability that the user will complete the target action in the application before the interaction session terminates.

6. The system of claim 5, wherein the instructions, when executed on the one or more processors, further cause the system to:

subtract the retention-prediction value from the updated retention-prediction value to determine a difference;

divide the difference by a time interval to determine a rate of change; and determine an updated time interval based on the rate of change.

7. The system of claim 1, wherein performing the intervention action includes:

open, via the application, a messaging interface; and establish a network connection with a live support agent to allow the user to communicate with the live support agent through the messaging interface.

8. A non-transitory computer-readable storage medium containing instructions that, when executed by one or more processors, perform an operation comprising:

sending one or more web pages for display to a user via a network during an interaction session between the user and an application, wherein the one or more web pages include elements for collecting response data from the user;

receiving, via the web pages, the response data from the user;

collecting, via the application, additional data that characterizes user behavior during the interaction session;

generating a composite data set from the response data and the additional data;

determining, via a first machine-learning model based on the composite data set, a retention-prediction value indicating a probability that the user will complete a target action in the application before the interaction session terminates;

determining that the retention-prediction value satisfies a threshold condition;

determining, via a second machine-learning model based on the composite data set and the retention-prediction value determined by the first machine-learning model, a predicted reason the interaction session is likely to terminate before the user completes the target action;

determining, via a third machine-learning model based on the composite data set and the predicted reason determined by the second machine-learning model, an intervention action for increasing the probability that the user will complete the target action before the interaction session terminates; and performing, via the application, the intervention action.

9. The non-transitory computer-readable storage medium of claim 8, wherein the operation further comprises:

determining, via a fourth machine-learning model based on the composite data set, a next action the user is anticipated to perform in the application; and altering at least one aspect of the one or more web pages to facilitate user performance of the next action.

10. The non-transitory computer-readable storage medium of claim 9, wherein the operation further comprises:

fetching, data related to the next action determined via the fourth machine-learning model.

11. The non-transitory computer-readable storage medium of claim 8, wherein determining the intervention action via the third machine-learning model includes:

inputting a set of input features that includes the retention-prediction value into the third machine-learning model.

12. The non-transitory computer-readable storage medium of claim 8, wherein the operation further comprises:

receiving, via the web pages, updated response data from the user;

collecting, via the application, updated additional data that characterizes user behavior during the interaction session;

generating an updated composite data set that includes both the updated response data and the updated additional data; and determining, via the first machine-learning model based on the updated composite data set, an updated retention-prediction value indicating an updated probability that the user will complete the target action in the application before the interaction session terminates.

13. The non-transitory computer-readable storage medium of claim 12, wherein the operation further comprises:

subtracting the retention-prediction value from the updated retention-prediction value to determine a difference;

dividing the difference by a time interval to determine a rate of change; and determining an updated time interval based on the rate of change.

14. The non-transitory computer-readable storage medium of claim 8, wherein performing the intervention action includes:

opening, via the application, a messaging interface; and establishing a network connection with a live support agent to allow the user to communicate with the live support agent through the messaging interface.

15. A method comprising:

sending one or more web pages for display to a user via a network during an interaction session between the user and an application, wherein the one or more web pages include elements for collecting response data from the user;

receiving, via the web pages, the response data from the user;

collecting, via the application, additional data that characterizes user behavior during the interaction session;

generating a composite data set from the response data and the additional data;

determining, via a first machine-learning model based on the composite data set, a retention-prediction value indicating a probability that the user will complete a target action in the application before the interaction session terminates;

determining that the retention-prediction value satisfies a threshold condition;

determining, via a second machine-learning model based on the composite data set and the retention-prediction value determined by the first machine-learning model, a predicted reason the interaction session is likely to terminate before the user completes the target action;

determining, via a third machine-learning model based on the composite data set and the predicted reason determined by the second machine-learning model, an intervention action for increasing the probability that the user will complete the target action before the interaction session terminates; and performing, via the application, the intervention action.

16. The method of claim 15, further comprising:

determining, via a fourth machine-learning model based on the composite data set, a next action the user is anticipated to perform in the application; and altering at least one aspect of the one or more web pages to facilitate user performance of the next action.

17. The method of claim 16, further comprising:

fetching, data related to the next action determined via the fourth machine-learning model.

18. The method of claim 15, wherein determining the intervention action via the third machine-learning model includes:

inputting a set of input features that includes the retention-prediction value into the third machine-learning model.

19. The method of claim 15, further comprising:

receiving, via the web pages, updated response data from the user;

collecting, via the application, updated additional data that characterizes user behavior during the interaction session;

generating an updated composite data set that includes both the updated response data and the updated additional data; and determining, via the first machine-learning model based on the updated composite data set, an updated retention-prediction value indicating an updated probability that the user will complete the target action in the application before the interaction session terminates.

20. The method of claim 19, further comprising:

subtracting the retention-prediction value from the updated retention-prediction value to determine a difference;

dividing the difference by a time interval to determine a rate of change; and determining an updated time interval based on the rate of change.

* * * * *